R. OSGOOD.
PNEUMATIC TIRE.
APPLICATION FILED JULY 5, 1921.
1,431,540. Patented Oct. 10, 1922.
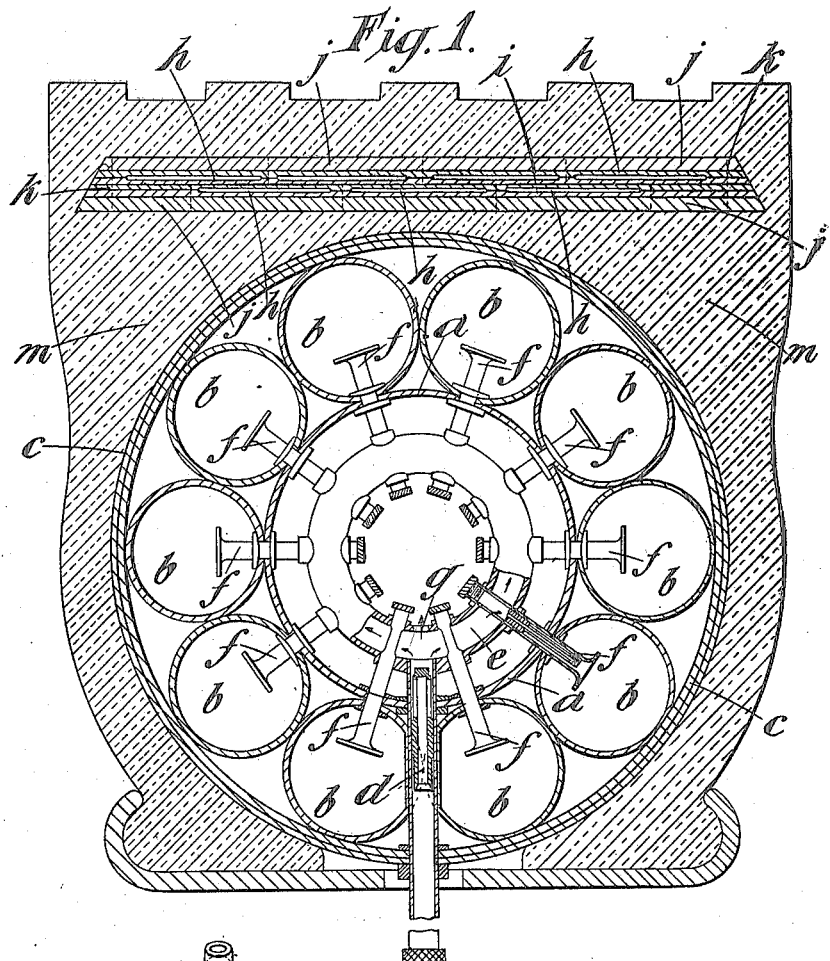
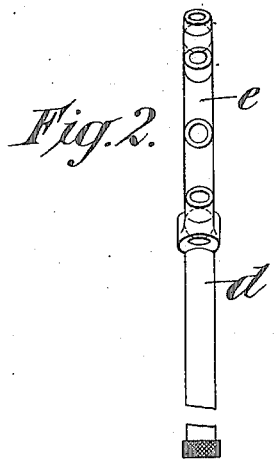
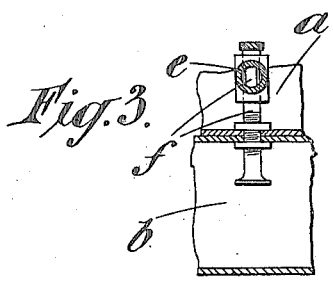
INVENTOR
ROBERT OSGOOD

Patented Oct. 10, 1922.

1,431,540

UNITED STATES PATENT OFFICE.

ROBERT OSGOOD, OF TORQUAY, ENGLAND.

PNEUMATIC TIRE.

Application filed July 5, 1921. Serial No. 482,496.

*To all whom it may concern:*

Be it known that I, ROBERT OSGOOD, a subject of the King of Great Britain and Ireland, and a resident of Torquay, county of Devon, England, have invented a certain new and useful Improvement in Pneumatic Tires, of which the following is a specification.

This invention relates to the kind of pneumatic tire in which a series of separate air chambers are enclosed within an outer air tube, each chamber being provided with its own non-return inflating valve which takes its supply of air from a chamber, common to all said non-return valves, provided with a main inflating valve.

The present invention has for its object the provision of an improved pneumatic tire of the above kind, characterized by its increased resiliency, and its unpuncturability, due to the arrangement of an inner air tube surrounded by a series of smaller air tubes arranged parallel to said inner air tube, all tubes being supplied with air from a hollow distributing ring, common to all the air tubes, and supplied from a main valve connected to said ring, and an unpuncturable band consisting of thin springy steel bands enclosed in leather pockets and between bands of "Dri-ped" leather, said band as a whole being rigidly built into the tread portion of the tire and below the peripheral surface thereof.

In order that the invention may be readily understood, reference is to be had to the following description and accompanying sheet of drawings, wherein:—

Figure 1 is a transverse sectional view of a tire constructed in accordance with the invention.

Figure 2 is a side view of the main valve of the said tire.

Figure 3 is a fragmentary sectional view illustrative of one of the supplemental air valves hereinafter referred to.

Like letters of reference indicate corresponding parts in the several figures.

In carrying out the invention, there is provided a main inner air tube $a$, Figure 1, which is surrounded by a series of smaller auxiliary air tubes $b$ connected to said inner tube $a$, the tubes $a$ and $b$ being enclosed within an outer canvas and rubber lining or casing $c$. Arranged within the outer casing or lining $c$ and connected to the inner tube $a$ is the main valve $d$, the same at its inner end being connected to a hollow distributing ring $e$, Figures 1 and 2, located within the inner air tube $a$, said ring $e$ in turn being connected to the smaller tubes $b$ by the supplemental non-return air valve $f$, a valve $f$ to each air tube $b$, the arrangement being such that the inner tube $a$ is supplied with air from the non-return main valve $d$ by way of the opening $g$ in the distributing ring $e$ whilst the air tubes $b$ are supplied with air from the distributing ring $e$ by way of the non-return valves $f$, which valves $f$ are in open communication with the ring $e$, Figures 1 and 3.

The valves $f$ are preferably connected to the air tubes $b$ by means of screwed nuts or discs, in suitable canvas and rubber formations, for vulcanization to the walls of said air tubes for firm connection, and the distributing ring $e$ is, at each junction with said air valves $f$, enlarged and strengthened to enable said valves to be screwed therein. Further, the outer ends of the valves $f$ are turned back or flanged so as to guard against any possibility of the air tube $a$ being perforated by any sudden crashing of the tire against a curbstone or other similar obstacle.

The puncture-proof band is a two-part band, an outer band and an inner band, each being constituted by a number of thin, springy steel bands $h$, Figure 1, arranged side by side and enclosed in pockets formed by two bands $i$ of box-calf leather sewn together, and a band $j$ of "Dri-ped" leather, the "Dri-ped" leather band $j$ of the outer band part being arranged outermost, whilst the "Dri-ped" leather band $j$ of the inner band part is arranged lowermost. The steel bands $h$ of the one part are arranged so as to break joint with the steel bands $h$ of the other part, said two parts being sewn together at $k$ near to their edges.

Further, the steel bands $h$ which overlap at their ends in the pockets and are riveted together, to exact size required, are finished off with rounded edges and are preferably lightly stamped, diamond pattern, to ensure immobility in the pockets, and the joints of the inner and outer parts of this puncture-proof band are arranged so as to come on opposite sides of the complete band, with a good fitting butt joint, clamped together by brass or copper clamps, riveted and sunk into the leather band flush and smooth, all rivets employed in the construction of this puncture-proof band being of brass or copper to obviate the setting up of rust and the consequential weakening of the band, the band, as a whole, being at suitable distances apart, riveted together, and built rigidly, during manufacture, into the tread portion of the outer cover or jacket *m* and below the tread surface thereof.

I claim:—

1. A pneumatic tire characterized by an inner air tube and a series of smaller air tubes connected to and surrounding and parallel to the inner air tube, a main inflating valve connected to said inner air tube, and to a hollow distributing ring located in said inner air tube, said hollow ring being in open communication with the inner air tube, and a non-return air valve to each smaller air tube, said non-return air valve being in open communication with the hollow distributing ring.

2. A pneumatic tire consisting of a tire shoe and a multiple chambered inner tube structure consisting of an outer casing, a centrally arranged main inner tube, a plurality of auxiliary tubes arranged about the main tube, a main air valve, a distributing ring connected to said main air valve and communicating with the main inner tube, and separate air valves carried by said ring and communicating with each auxiliary tube.

In testimony whereof I have affixed my signature hereto, this 15th day of June 1921.

ROBERT OSGOOD.